US008922715B2

(12) United States Patent
Choi et al.

(10) Patent No.: US 8,922,715 B2
(45) Date of Patent: Dec. 30, 2014

(54) DISPLAY APPARATUS AND CONTROL METHOD FOR CONTROLLING THE DISPLAY APPARSATUS USING A MANIPULATION PANEL

(71) Applicant: Samsung Electronics Co., Ltd., Suwon-si (KR)

(72) Inventors: Ho-yang Choi, Suwon-si (KR); Young-joong Noh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/845,417

(22) Filed: Mar. 18, 2013

(65) Prior Publication Data

US 2013/0242205 A1 Sep. 19, 2013

(30) Foreign Application Priority Data

Mar. 19, 2012 (KR) ........................ 10-2012-0027815

(51) Int. Cl.
*H04N 9/74* (2006.01)
*H04N 5/445* (2011.01)
*H04N 5/44* (2011.01)
*H04N 21/431* (2011.01)
*H04N 21/482* (2011.01)

(52) U.S. Cl.
CPC ............. *H04N 5/4403* (2013.01); *H04N 5/445* (2013.01); *H04N 21/4316* (2013.01); *H04N 21/482* (2013.01)
USPC .......................................... 348/564; 348/836

(58) Field of Classification Search
USPC ............ 348/564, 569, 734, 553, 836; 725/37, 725/38; 345/173
See application file for complete search history.

(56) References Cited

U.S. PATENT DOCUMENTS

| 5,648,824 | A  | * | 7/1997  | Dunn et al. ...................... 725/88   |
| 5,889,506 | A  | * | 3/1999  | Lopresti et al. ................ 345/158  |
| 7,545,447 | B2 | * | 6/2009  | Matsumura et al. ........... 348/839   |
| 7,737,999 | B2 | * | 6/2010  | Ardhanari et al. ............. 345/685   |
| 7,821,377 | B2 | * | 10/2010 | Arai et al. ...................... 340/3.71  |
| 7,966,568 | B2 |   | 6/2011  | Kim                                    |
| 8,352,986 | B2 | * | 1/2013  | Uchida et al. ................... 725/48  |
| 8,629,754 | B2 | * | 1/2014  | Schafer et al. ................. 340/4.11 |
| 2003/0160832 | A1 | * | 8/2003 | Ridgley et al. ................ 345/854 |
| 2009/0109056 | A1 | * | 4/2009 | Tamarkin et al. ........ 340/870.02 |
| 2011/0090898 | A1 | * | 4/2011 | Patel et al. ..................... 370/352 |
| 2012/0198488 | A1 | * | 8/2012 | Son et al. ......................... 725/14 |
| 2013/0070153 | A1 | * | 3/2013 | Hill et al. ...................... 348/569 |

* cited by examiner

*Primary Examiner* — Victor Kostak
(74) *Attorney, Agent, or Firm* — Sughrue Mion, PLLC

(57) ABSTRACT

A display apparatus and a control method which receives a user's input by using a manipulation panel are provided. The display apparatus includes: an image processor; a display unit; a user input unit which includes a manipulation panel; and a controller which controls the display unit to display a user interface (UI) including a number keypad upon receiving a preset user's input from the user input unit and receives a user's selection to select a channel number from the number keypad according to a user's input to the direction key. Thus, the direction keys are provided in the manipulation panel installed in a front or lateral side of the display apparatus and a user may input a desired channel number without difficulty when selecting channels through the manipulation panel.

16 Claims, 10 Drawing Sheets

(a)

(b)

ately appreciated from the following description of
DISPLAY APPARATUS AND CONTROL METHOD FOR CONTROLLING THE DISPLAY APPARSATUS USING A MANIPULATION PANEL

CROSS-REFERENCE TO RELATED APPLICATION

This application claims priority from Korean Patent Application No. 10-2012-0027815, filed on Mar. 19, 2012 in the Korean Intellectual Property Office, the disclosure of which is incorporated herein by reference.

BACKGROUND

1. Field

Apparatuses and methods consistent with the exemplary embodiments relate to a display apparatus and a control method thereof, and more particularly, to a display apparatus and a control method thereof which receives a user's input by using a manipulation panel.

2. Description of the Related Art

A display apparatus such as a television (TV) processes image signals/image data transmitted by various external image supply sources or stored in the display apparatus and displays an image on a display panel. For example, a display apparatus which is provided to general users may include a TV or a monitor. The display apparatus, which is realized as a TV, processes a broadcasting signal transmitted from an external source through various image processing operations such as decoding and scaling operations and provides an image of a desired broadcasting channel.

A user may select a desired channel by manipulating a user input unit such as a remote controller. For example, a user may select a channel by manipulating a number keypad in the remote controller and inputting a desired channel (content) number.

Otherwise, a user may select a channel by manipulating a manipulation panel provided in a display apparatus.

As the display apparatus becomes smaller and consumers prefer a more aesthetic design, it is more difficult to provide a space for the manipulation panel in the display apparatus. For example, if the manipulation panel is provided in a front or lateral side of the display apparatus, it is hard to design the manipulation panel because in recent designs of display apparatuses, an external circumference (or bezel) of the screen is designed to be narrower.

Generally, the manipulation panel is designed to have buttons arranged in a row and to have a minimum number of buttons. For example, buttons relating to a channel may have two buttons which are arranged side by side to change a current channel to a previous channel (CH−) and a next channel (CH+).

Thus, a user may change a channel in a sequential order only such as changing a current channel to a previous or next channel. If a desired channel is not adjacent to the current channel, a user has to repeatedly manipulate a particular channel-change button until the channel is changed to the desired channel, which is very inconvenient.

SUMMARY

The foregoing and/or other aspects may be achieved by providing a display apparatus including: an image processor which processes an image signal; a display unit which displays an image thereon based on the processed image signal; a user input unit which includes a direction key and receives a user's input; and a controller which controls the display unit to display thereon a user interface (UI) including a number keypad upon receiving a preset user's input from the user input unit and receives a user's selection to select a channel number from the number keypad according to a user's input to the direction key.

The direction key may be provided in the display apparatus and may include a plurality of keys corresponding to four directions including top, bottom, left and right sides.

The controller may recognize a user's input to the direction keys, as a command to move in a direction of the number keypad corresponding to a direction key selected from the plurality of directions keys.

The preset user's input may include a combination of a plurality of keys included in the user input unit.

The controller may change the display apparatus to a channel selection mode according to the preset user's input and may control the display unit to display thereon the number keypad if the display apparatus is in a TV mode.

The user's input to select the channel number may select at least one of the numbers included in the number keypad.

The controller may control the display unit to further display a display window displaying a result of the user's input.

The controller may control the image processor to process an image signal of a channel corresponding to the selected channel number and may control the display unit to display thereon an image corresponding to the processed image signal.

Another aspect of the exemplary embodiments provides a control method of a display apparatus including: receiving a preset user's input from a user input unit including a direction key; displaying a user interface (UI) including a number keypad; and selecting a channel number from the displayed number keypad according to a user's input to the direction key.

The direction key may be provided in the display apparatus and may include a plurality of direction keys corresponding to four directions including top, bottom, left and right sides.

The selecting the channel number may include recognizing the user's input to the direction keys as a command to move in a direction of the number keypad corresponding to the direction key selected from the plurality of direction keys.

The preset user's input may include a combination of a plurality of keys included in the user input unit.

The control method may further include determining whether the display apparatus is in a TV mode; and changing the display apparatus to a channel selection mode according to the preset user's input and displaying the number keypad if it is determined that the display apparatus is in the TV mode.

The selecting the channel number may include selecting at least one of numbers included in the number keypad.

The control method may further include displaying a result of the user's input in a display window.

The control method may further include processing an image signal of a channel corresponding to the selected channel number; and displaying an image corresponding to the processed image signal.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION OF THE EXEMPLARY EMBODIMENTS

Figure 1:
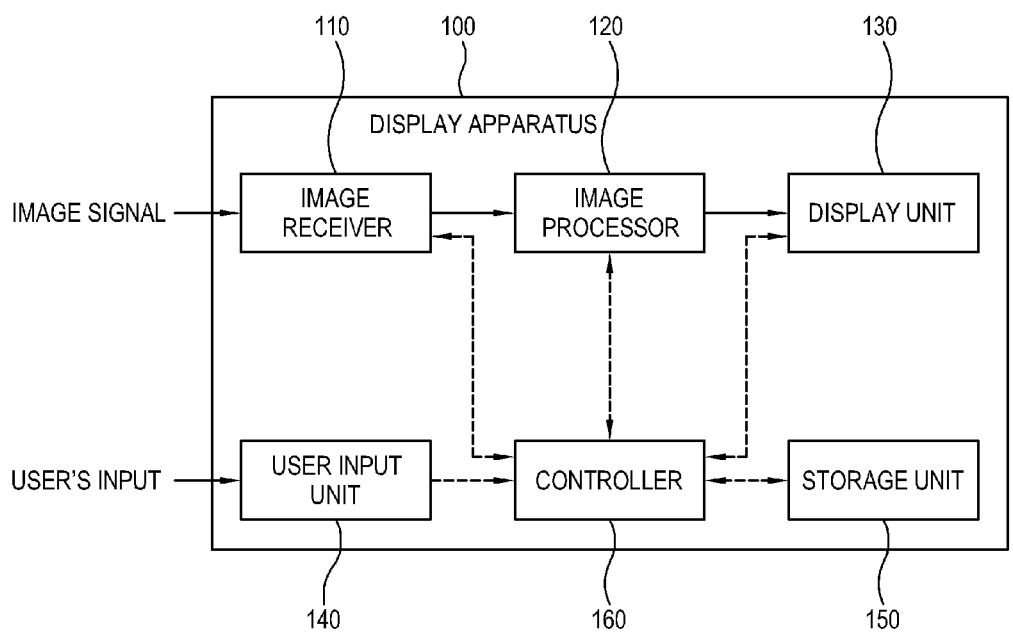
FIG. 1 is a block diagram of a display apparatus according to an exemplary embodiment.

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout.

FIG. 1 is a block diagram of a display apparatus 100 according to an exemplary embodiment.

As shown therein, the display apparatus 100 processes an image signal supplied by an external image supply source (not shown) according to a preset image processing operation, and displays an image based on the processed image signal.

The display apparatus 100 according to the present exemplary embodiment includes a TV which displays a broadcasting image based on broadcasting signals/broadcasting information/broadcasting data transmitted by a transmission device of a broadcasting station. However, the spirit of the exemplary embodiments are not limited to the foregoing exemplary embodiment type of the display apparatus 100, to which various types of exemplary embodiments displaying an image such as a TV may apply.

The type of an image which is displayable by the display apparatus 100 is not limited to a broadcasting signal. For example, the display apparatus 100 may display video, still images, applications and on-screen display (OSD) based on signals/data supplied by various image supply sources, and a graphic user interface (GUI) for controlling various operations, but not limited thereto.

As shown therein, the display apparatus 100 includes an image receiver 110 which receives an image signal, an image processor 120 which processes an image signal received by the image receiver 110, a display unit 130 which displays thereon an image based on the image signal processed by the image processor 120, a user input unit 140 which receives a user's input, a storage unit 150 which stores therein various data, and a controller 160 which controls the display apparatus 100.

The image receiver 110 receives and transmits an image signal to the image processor 120. The image receiver 110 may vary depending on a standard of a received image signal and the exemplary embodiment type of the display apparatus 100. For example, the image receiver 110 may receive a radio frequency (RF) signal in a wireless manner from a broadcasting station (not shown), or receive image signals in a wired manner according to standards such as composite video, component video, super video, SCART, high definition multimedia interface (HDMI), etc. The image receiver 110 may include a tuner to tune a broadcasting signal by channel if the image signal includes a broadcasting signal.

The image signal may be input from an external source, e.g., from an external device such as a personal computer (PC), AV device, smart phone, smart pad, etc. The image signal may result from data which are received through a network such as the Internet. In this case, the display apparatus 100 may further include a network communication unit (not shown) which communicates through a network. The image signal may result from data stored in a non-volatile storage unit 150 such as a flash memory, a hard disc drive, etc. The storage unit 150 may be provided within or outside the display apparatus 100. If the storage unit 150 is provided outside the display apparatus 100, the display apparatus 100 may further include a connector (not shown) to which the storage unit 150 is connected.

The image processor 120 performs preset various image processing operations with respect to an image signal. The image processor 120 outputs the processed image signal to the display unit 130 to display an image on the display unit 130 based on the image signal.

The image processing operations of the image processor 120 include a decoding operation corresponding to various image formats, a de-interlacing operation, a frame refresh rate conversion operation, a scaling operation, a noise reduction operation to improve an image quality, a detail enhancement operation, and a line scanning operation, but is not limited thereto. The image processor 120 may be realized as a group of individual elements which may individually perform the foregoing operations, or as a system-on-chip (SoC) which integrates such operations.

The display unit 130 displays thereon an image based on an image signal processed by the image processor 120. The display unit 120 may include liquid crystal, plasma, light-emitting diode, organic light-emitting diode, surface-conduction electron-emitter, carbon nano-tube, and nano-crystal, but is not limited thereto.

The display unit 130 may further include additional elements depending on its exemplary embodiment type. For example, if the display unit 130 includes liquid crystal, it may further include a liquid crystal display (LCD) panel (not shown), a backlight unit (not shown) emitting light to the LCD panel, and a panel driving substrate (not shown) driving the LCD panel.

The user input unit 140 transmits preset various control commands or unlimited information to the controller 160 by a user's manipulation and input. The user input unit 140 may be realized as a manipulation panel 20 (FIG. 2) including a button such as a menu key (not shown) installed in an external side of the display apparatus 100 or may be realized as a remote controller that is separated from the display apparatus 100. If the user input unit 140 includes a remote controller, there is no restriction in transmitting a user's input from the user input unit 140 to the controller 160, and a wireless communication may be used. The wireless communication includes infrared communication, RF communication, etc. In this case, the display apparatus 100 may further include a communication module (not shown) which receives a signal corresponding to a user's input from the user input unit 140 and transmits the signal to the controller 160.

Figure 2:
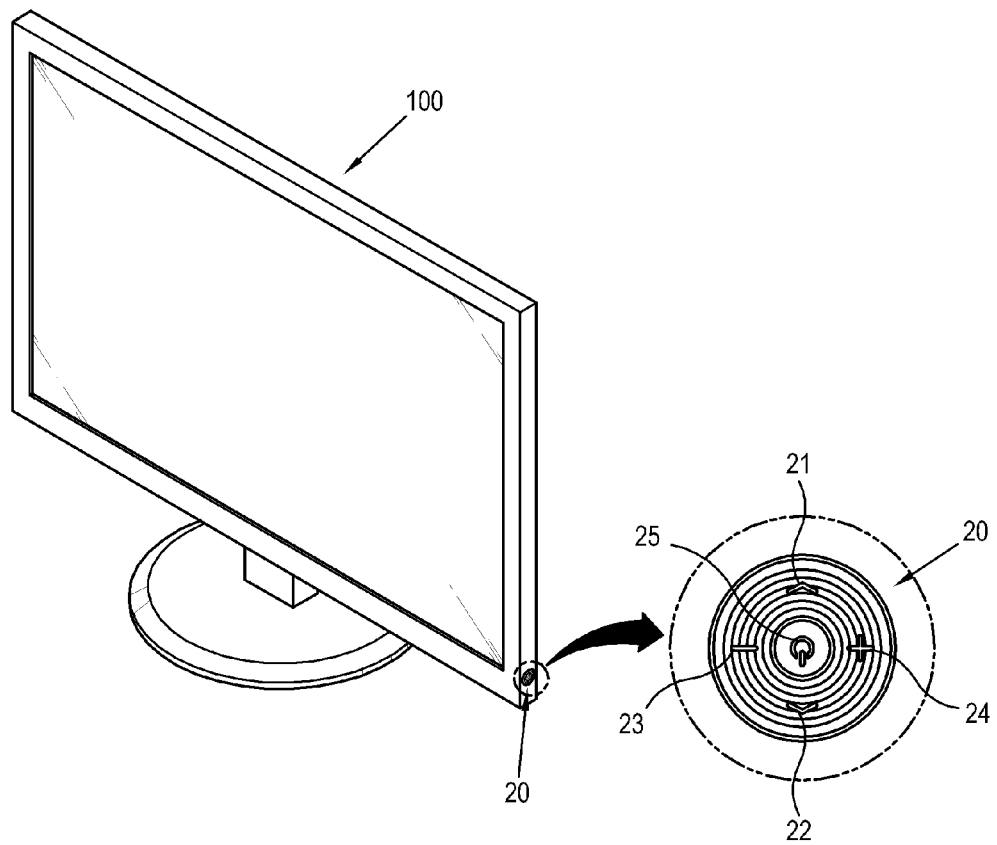
FIG. 2 illustrates an example of a manipulation panel 20 installed in the display apparatus according to an exemplary embodiment.

The user input unit 140 which is realized as the manipulation panel 20 according to the present exemplary embodiment includes a plurality of direction keys 21, 22, 23 and 24 as shown in FIG. 2.

FIG. 2 illustrates an example of the manipulation panel 20 installed in the display apparatus 100 according to an exemplary embodiment.

In FIG. 2, the manipulation panel 20 is provided in a lateral side of the display apparatus 100. However, this is an example and the manipulation panel 20 may be displayed in other locations including a rear, upper, lower or front side thereof.

In FIG. 2, the manipulation panel 20, including the plurality of direction keys 21, 22, 23 and 24, has a circular shape, but this is an example, and the manipulation panel 20 may have other shapes including, but not limited to, a cross or lozenged shape.

As shown therein, the direction keys 21, 22, 23 and 24 according to the present exemplary embodiment include a top key 21, a bottom key 22, a left key 23 and a right key 24.

The bottom and top keys 22 and 21 may be set to receive a command for sequentially changing a current channel to an adjacent previous channel ((CH−) 22) and a next channel ((CH+) 21) corresponding to a user's manipulation for the direction key. The left and right keys 23 and 24 may be set to receive a command for increasing a volume ((VOL+) 23) or decreasing a volume ((VOL−) 24) corresponding to a user's manipulation for the direction key.

The manipulation panel 20 according to the present exemplary embodiment may further include a power key 25. The power key 25 may have a circular shape and may be provided in a center of the direction keys 21, 22, 23 and 24, but is not limited thereto in location and shape.

The user input unit 140 may include a user interface (UI) which is displayed on the display unit 130 to receive a user's selection. The UI according to the present exemplary embodiments includes a number keypad (hereinafter, to be also called "dial OSD") shown in FIGS. 3 to 9, and a display window 40 displaying a result of a user's input. If the display unit 130 includes a touch screen, the user input unit 140 may transmit to the controller 160 a command corresponding to a user's input which is generated by a user touching the UI of the display unit 130.

A user may manipulate the direction keys 21, 22, 23 and 24 provided in the manipulation panel 20 and select a UI displayed on the display unit 130. In the present exemplary embodiment, a user manipulates the direction keys 21, 22, 23 and 24 of the manipulation panel 20 as the user input unit 140 and selects the UI displayed on the display unit 130. However, the spirit of the exemplary embodiments are not limited to the foregoing case, and a user's input may be generated through various other means including, but not limited to, a remote controller.

The storage unit 150 stores therein unlimited data according to a control of the controller 160. The storage unit 150 includes a non-volatile storage medium such as a flash memory and a hard disc drive. The storage unit 150 is accessed by the controller 160, and data are read/recorded/amended/deleted/updated by the controller 160.

The data stored in the storage unit 150 include, e.g. an operating system for driving the display apparatus 100, and other various applications, which are executed in the operating system, and image data and additional data.

The storage unit 150 according to an exemplary embodiment further stores therein operation mode information of the display apparatus 100, and setting information for the plurality of direction keys 21, 22, 23 and 24 and the power key 25 with respect to a predetermined operation mode. The operation mode may include a TV mode, a channel selection mode, an external input mode, and a USB connection mode.

The setting mode may be set for the bottom and top keys 22 and 21 to receive a command for sequentially changing a current channel to an adjacent previous channel ((CH−) 22) and a next channel ((CH+) 21). The left and right keys 23 and 24 may be set to receive a command to increase the volume ((VOL+) 23) and decrease the volume ((VOL−) 24). The power key 25 is set to receive a command for turning on or off the display apparatus 100.

The setting information according to an exemplary embodiment may be set to move a selection item of the number keypad 30 (FIG. 3) displayed on the display unit 130 in a corresponding direction according to a manipulation of the direction keys 21, 22, 23, and 24 in the channel selection mode. For example, if a user selects the top key 21 while the display apparatus 100 operates in the channel selection mode, the selection item of the number keypad 30 is changed to a selection item located above the current selection item.

The power key 25 may be set to perform a click or enter function with respect to an item selected by the manipulation of the direction keys 21, 22, 23 and 24 in the channel selection mode.

The display apparatus 100 according to an exemplary embodiment recognizes a user's input to the keys of the manipulation panel 20 differently in the channel selection mode from in the remaining operation mode.

The setting information according to an exemplary embodiment further includes mode change information which is set to change the display apparatus 100 to a channel selection mode by a preset user's input of the manipulation channel 20. The preset user's input may include a combination of a plurality of keys of the user input unit 140, i.e., the manipulation panel 20.

For example, the mode change information may be set to change the operation mode of the display apparatus 100 to the channel selection mode if the power key 25 and the right key 24 are selected simultaneously. The set combination of the keys is not limited to the power key 25 and the right key 24, and may vary including a simultaneous selection of a plurality of keys and a sequential selection of the keys at a predetermined time interval.

The controller 160 performs control operations for various elements of the display apparatus 100. For example, the controller 160 controls entire operations of the display apparatus 100 by controlling the image processor 120 to process an image and by performing a corresponding control operation with respect to a command of the user input unit 140.

Figure 3:
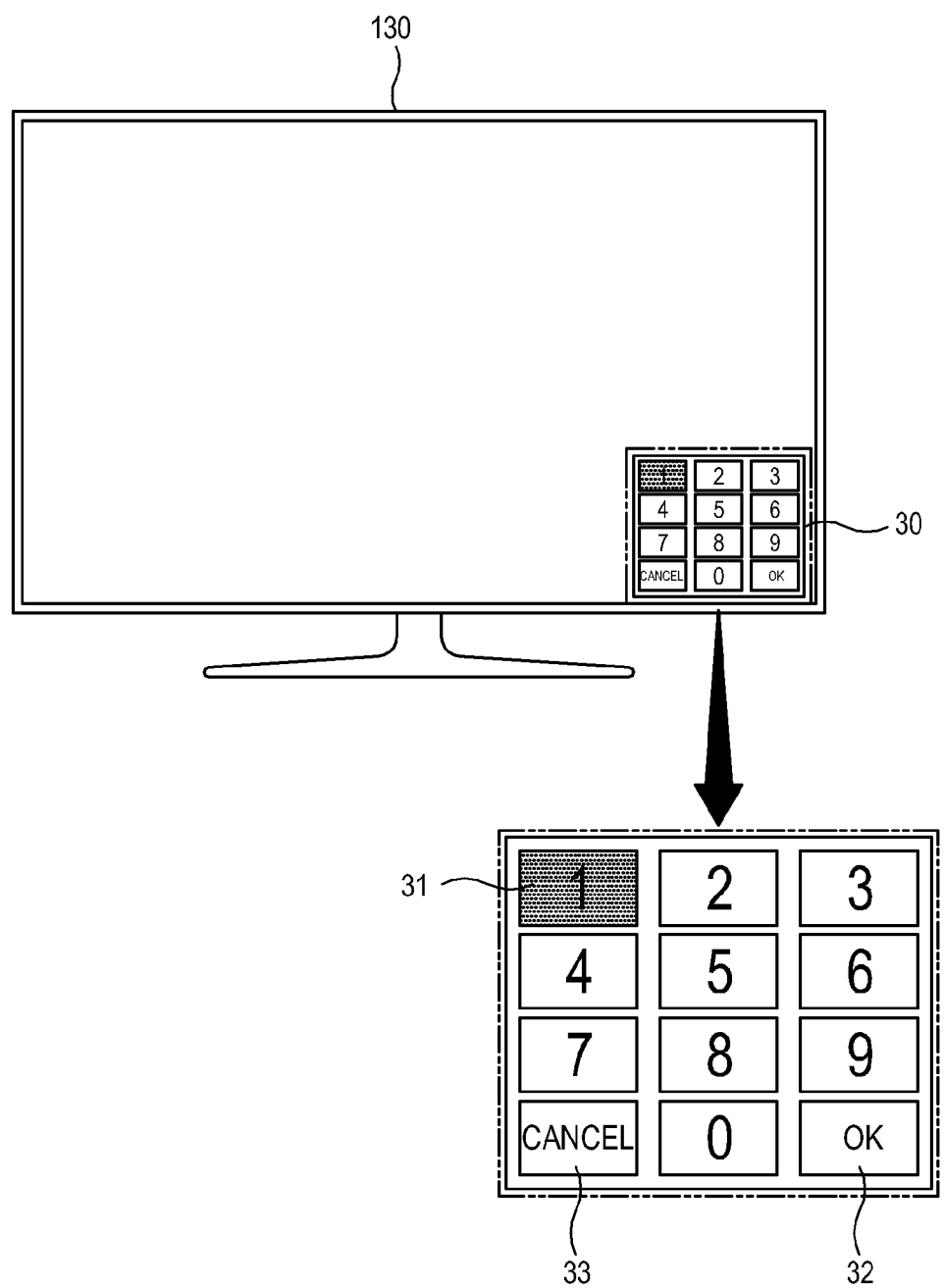
FIGS. 3, 8 and 9 illustrate a screen displayed on a display unit.

More specifically, referring to FIG. 3, upon receiving a preset user's input (e.g. simultaneous selection of the power key 25 and the right key 24) through the user input unit 140, the controller 160 changes the operation mode of the display apparatus 100 to the channel selection mode and controls the display unit 130 to display thereon a UI including a number keypad 30. Upon receiving the preset user's input while the display apparatus 100 operates in the TV mode, the controller 160 may change the operation mode to the channel selection mode.

The number keypad 30 is displayed in a predetermined location of the display unit 130. According to an exemplary embodiment, the number keypad 30 is located in a right bottom of the display unit 130 which is adjacent to the manipulation panel 20 for a user to identify the selection item to manipulate the direction keys 21, 22, 23 and 24. The location of the number keypad 30 may be changed depending on the location of the manipulation panel 20, and is not limited to the location shown in the drawing.

The controller 160 controls the display unit 130 to highlight and display a selection item (number) from the number keypad 30. As a highlight, the controller 160 may control the display unit 130 to focus on the selection item. However, the exemplary embodiment is not limited to the foregoing case, and various processing methods including pointer, cursor, highlight, and flickering may apply. A user may easily recognize the highlighted item in the number keypad 30, as the current selection item.

Figure 6:
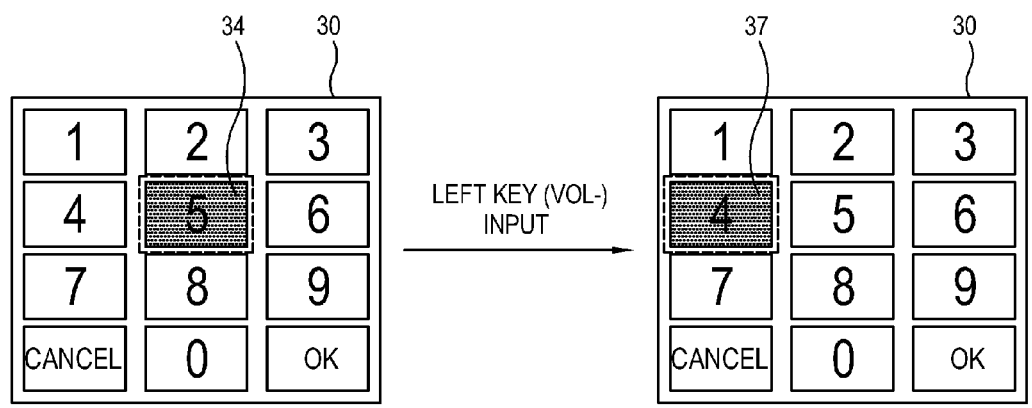
Figure 7:
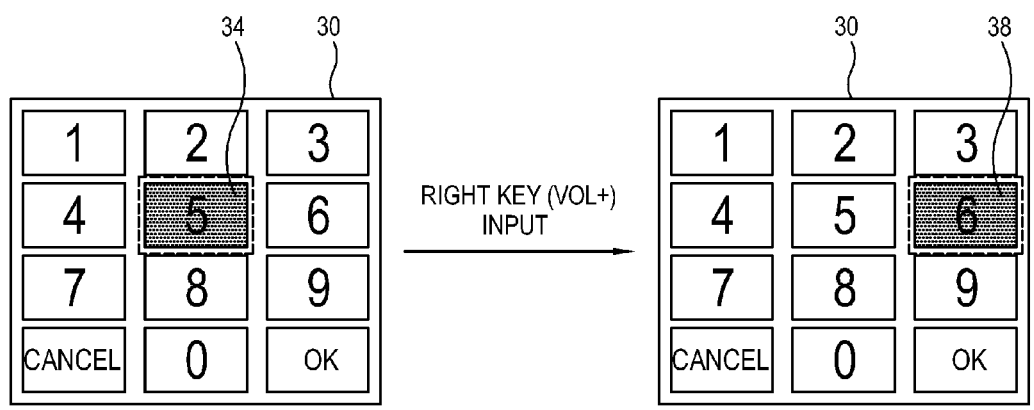
Figure 8:
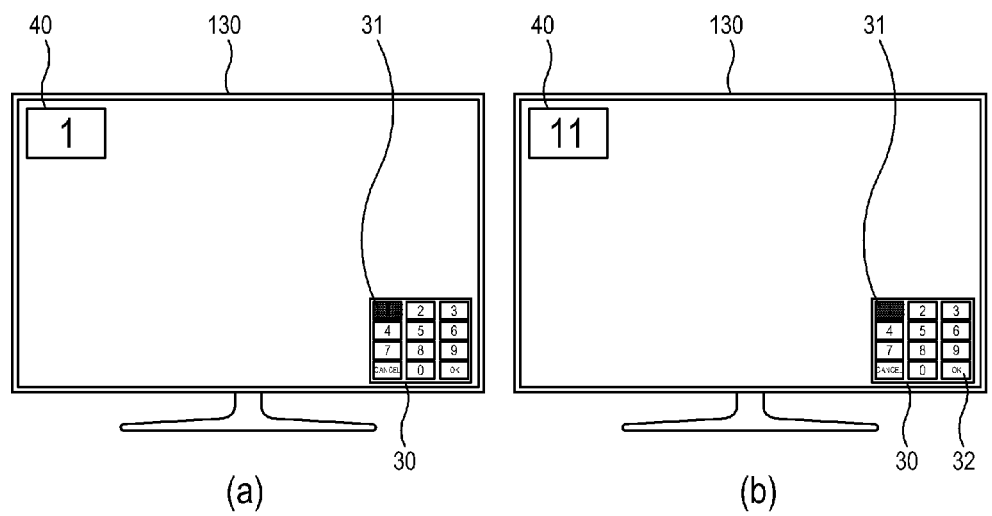
Figure 8:
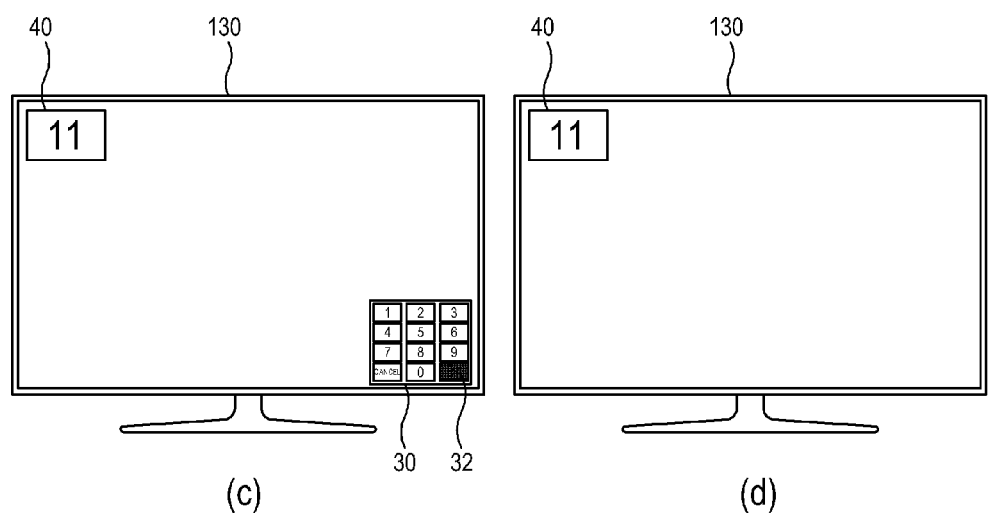
Figure 9:
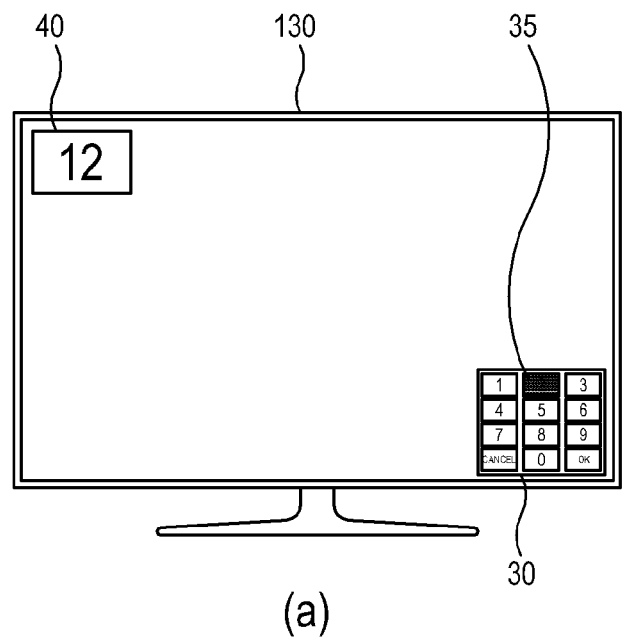
Figure 9:
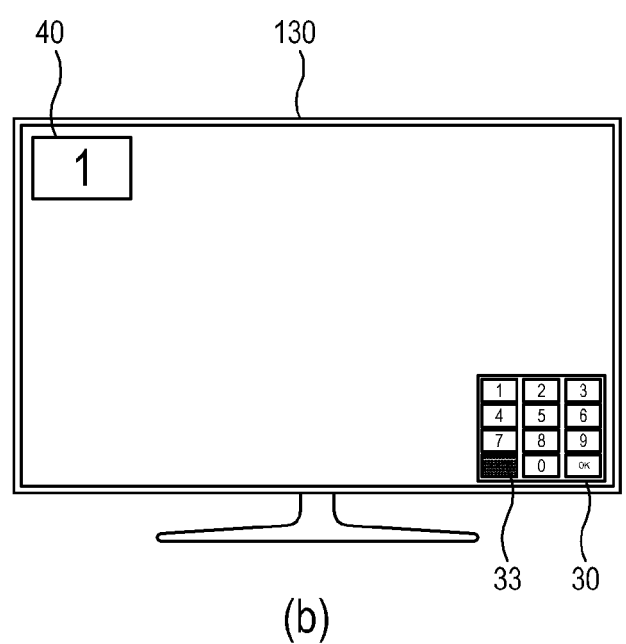

FIGS. 3, 8 and 9 illustrate a screen displayed on the display unit 130, and FIGS. 4 to 7 illustrate the number keypad 30 displayed corresponding to a selection of the direction keys 21, 22, 23 and 24.

As shown therein, the number keypad 30 includes a plurality of number keys 31, 34, 35 and 36, an OK key 32 and a CANCEL key 33.

The controller 160 receives a user's selection to select a channel number from the number keypad 30 displayed according to a user's input to the direction keys 21, 22, 23 and 24. The controller 160 recognizes the user's input to the direction keys 21, 22, 23 and 24 as a command to move in a direction of the number keypad 30 corresponding to a direction key selected from the plurality of direction keys 21, 22, 23 and 24.

Figure 4:
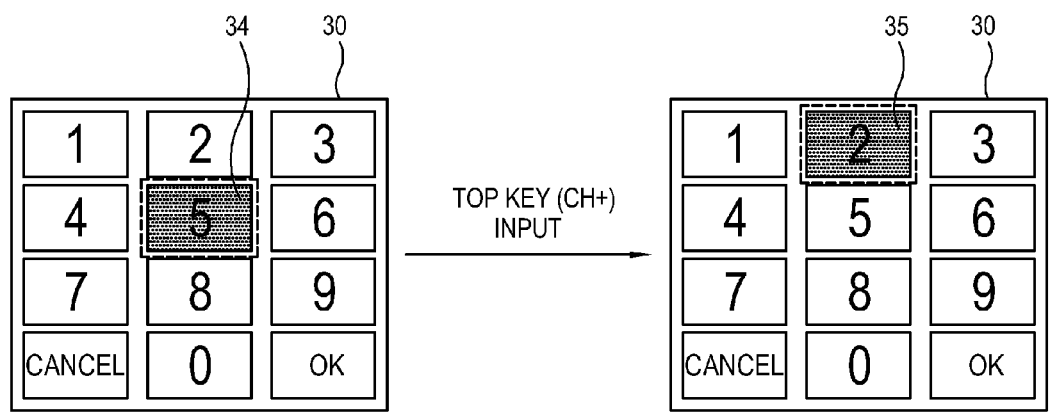
FIGS. 4 to 7 illustrate a number keypad displayed corresponding to a selection of a direction key.

For example, if a user selects the top key (CH+) 21 while the first item 34 is selected as in FIG. 4, the controller 160 changes the selection item of the number keypad 30 to a second item 35 provided above the first item 34 which has been selected currently. The controller 16 may highlight and display the selected item, i.e., the second item 35.

Figure 5:
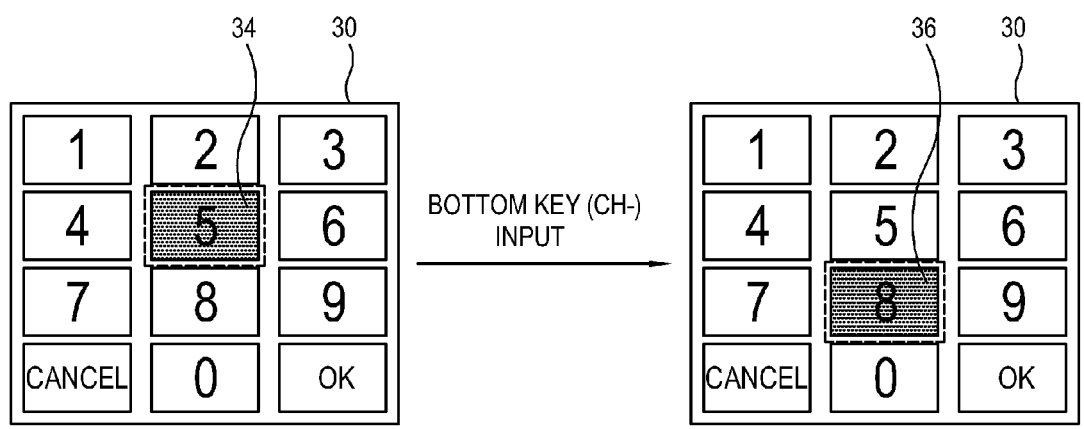

Likewise, if a user selects the bottom key ((CH−) 22) while the first item 34 is selected as in FIG. 5, the controller 160 changes the selection item of the number keypad 30 to a third item 36 provided below the first item 34. The controller 160 may highlight and display the third item 36.

If a user selects the left key ((VOL−) 23) while the first item 34 is selected as in FIG. 6, the controller 160 changes the selection item of the number keypad 30 to a fourth item 37 provided in the left side of the first item 34. The controller 160 may highlight and display the fourth item 37.

If a user selects the right key ((VOL+) 24) while the first item 34 is selected as in FIG. 7, the controller 160 changes the selection item of the number keypad 30 to a fifth item 38 provided in the right side of the first item 34. The controller 160 may highlight and display the fifth item 38.

A user may select a desired number from the number keypad 30 through the direction keys 21, 22, 23 and 24 of the manipulation panel 20 and select the channel more easily by using the manipulation panel 20.

The controller 160 controls the display unit 130 to further display a display window 40 displaying a result of a user's input as in FIGS. 8 and 9. In FIGS. 8 and 9, the display window 40 is displayed on a left top of the display unit 130, but not limited thereto.

For example, if a user selects the number 1 (31, FIG. 8) from the number keypad 30 through the direction keys 21, 22, 23 and 24 and manipulates the power key 25 while the number keypad 30 is displayed as the display apparatus 100 is changed from the TV mode to the channel selection mode through a user's input, the controller 160 displays the selected number 1 in the display window 160 ((a) in FIG. 8). If a user manipulates the power key 25 again while the number 1 (31) is selected, the controller 160 controls the display unit 130 to display a number 11 as an input result in the display window 160 ((b) in FIG. 8). If a user moves the selection item in the number keypad 30 to the OK key 32 through the direction keys 21, 22, 23 and 24 and manipulates the power key 25 ((c) in FIG. 8), the controller 160 determines that the selection of the channel number 11 has been completed and controls the display unit 130 to discharge the channel selection mode and to disable the number keypad 30 ((d) in FIG. 8).

The controller 160 controls the image receiver 110 to receive an image signal of a channel corresponding to the selected channel number 11, and controls the image processor 120 to process the received image signal. The controller 160 controls the display unit 130 to display thereon an image corresponding to the processed image signal. The controller 160 controls the display apparatus 100 to return to the TV mode.

A user may amend the selected channel number by using the CANCEL key 33. For example, when a number 1 is displayed in the display window 160 by a user's selection of the number 1 (31) as in (a) in FIG. 8, if a user manipulates the right key 24 and the power key 25, the controller 160 controls the display unit 130 to display a number 12 as an input result in the display window 160 ((a) in FIG. 9). If a user moves the selection item in the number keypad 30 to the CANCEL key 33 through the direction keys 21, 22, 23 and 24 and manipulates the power key 25, the controller 160 controls the display unit 130 to delete from the display window 40 the number 2 which has most recently been selected ((b) in FIG. 9).

A user may move the selection item to a desired number and click the number by manipulating the direction keys 21, 22, 23 and 24 and the power key 25 and select the channel number as in (b) to (d) in FIG. 8.

Hereinafter, a control method of the display apparatus 100 according to the present exemplary embodiment will be described with reference to accompanying drawings.

Figure 10:
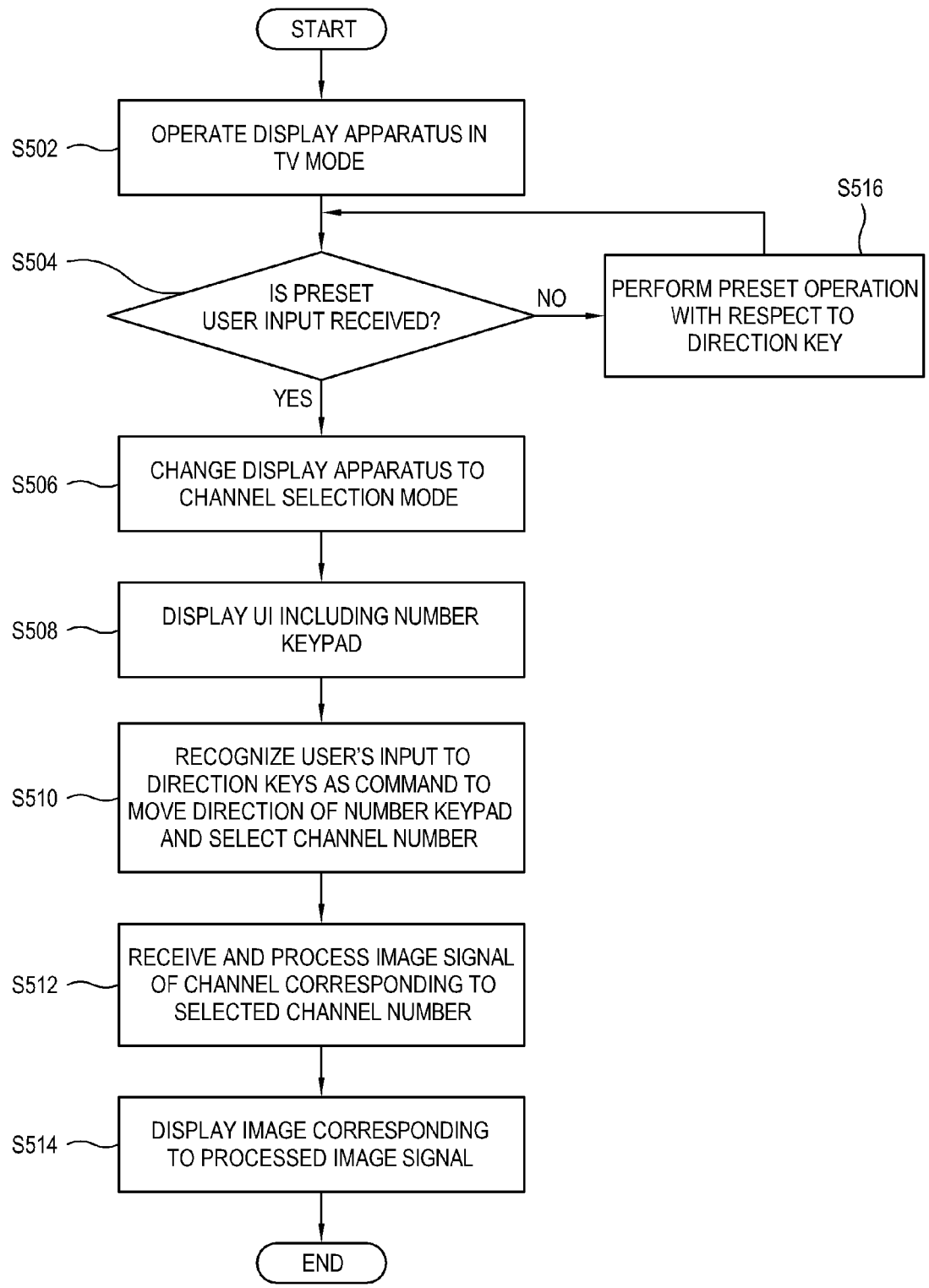
FIG. 10 is a flowchart showing a control method of a display apparatus according to an exemplary embodiment.

FIG. 10 is a flowchart showing a control method of the display apparatus 100 according to an exemplary embodiment.

As shown therein, the display apparatus 100 may operate in the TV mode (operation S502).

The controller 160 determines whether a preset user's input is received with respect to the manipulation panel 20 as the user input unit 160 in the TV mode (operation S504). The preset user's input may include a combination of the direction keys 21, 22, 23 and 24 and the power key 25 of the manipulation panel 20.

If the preset user's input is received at operation 5504, the controller 160 changes the display apparatus 100 to the channel selection mode (operation S506).

The controller 160 controls the display unit 130 to display thereon the UI including the number keypad 30 (operation S508).

The controller 160 recognizes a user's input to the direction keys 21, 22, 23 and 24 as the command to move the selection item of the number keypad 30 in a direction displayed at operation S508 (operation S510). The controller 160 controls the display unit 130 to display thereon the selected channel number in the display window 40 and to disable the number keypad 30 if the selection of the channel number is completed, and controls the display apparatus 100 to return to the TV mode.

The controller 160 controls the image receiver 110 and the image processor 120 to receive and process an image signal of the channel number selected at operation 5510 (operation S512).

The controller 160 controls the display unit 130 to display an image corresponding to the image signal processed at operation 5512 (operation S514).

If the preset user's input is not received at operation 5504, the display apparatus 100 continues to operate in the TV mode, and the controller 160 performs a preset operation to the direction keys 21, 22, 23 and 24 and the power key 25 (e.g. the bottom and top keys 22 and 21 sequentially change the channel to the adjacent previous channel ((CH−) 22) and next channel ((CH+) 21) and the left and right keys 23 and 24 raise the volume ((VOL+) 23) or lower the volume ((VOL−) 24) and the power key 25 turns on or off the display apparatus 100) (operation S516). Even if the display apparatus 100 is not in the TV mode, e.g., is in an external input mode, the controller 160 may perform the preset operation to the direction keys 21, 22, 23 and 24 and the power key 25 as at operation S516.

In the exemplary embodiment, the number keypad 30 is displayed and a user selects the channel through the direction keys 21, 22, 23 and 24, but is not limited thereto. The exemplary embodiment may apply to the case where a letter keypad is displayed and a letter is input through the direction keys 21, 22, 23 and 24 and the result is displayed in the display window 40.

According to the exemplary embodiment, the direction keys 21, 22, 23 and 24 are provided in the manipulation panel 20 installed in a front or lateral side of the display apparatus 100, and a user may input a desired channel number without difficulty to thereby reduce inconvenience in selecting channels through the manipulation panel 20.

The display unit 130 displays the display window 40, and also displays the number keypad 30. The display unit also displays a result of a user's selection which improve convenience in manipulating the direction keys 21, 22, 23 and 24.

Although a few exemplary embodiments have been shown and described, it will be appreciated by those skilled in the art that changes may be made in these exemplary embodiments without departing from the principles and spirit of the application, the range of which is defined in the appended claims and their equivalents.

What is claimed is:

1. A display apparatus comprising:
    an image processor which processes an image signal;
    a display device which displays an image thereon based on the processed image signal;
    a user input device which comprises a manipulation panel, and which receives a user's input; and
    a controller which controls the display device to display thereon a user interface (UI) comprising a number keypad upon receiving a preset user's input from the user input device, and receives a user's selection to select a channel number from the number keypad according to a user's input to the manipulation panel,
    wherein the manipulation panel is provided in the display apparatus and comprises a plurality of direction keys which correspond to four directions comprising a top direction, a bottom direction, a left direction and a right direction.

2. The display apparatus according to claim 1, wherein the controller recognizes a user's input to the manipulation panel as a command to move in a direction of the number keypad which corresponds to a direction key selected from the plurality of directions keys.

3. The display apparatus according to claim 1, wherein the preset user's input comprises a combination of a plurality of keys located in the user input device.

4. The display apparatus according to claim 1, wherein the controller changes the display apparatus to a channel selection mode according to the preset user's input and controls the display device to display thereon the number keypad if the display apparatus is in a television (TV) mode.

5. The display apparatus according to claim 1, wherein the user's input to select the channel number selects at least one of numbers located in the number keypad.

6. The display apparatus according to claim 1, wherein the controller controls the display device to further display a display window which displays a result of the user's input.

7. The display apparatus according to claim 1, wherein the controller controls the image processor to process an image signal of a channel which corresponds to the selected channel number and controls the display device to display thereon an image corresponding to the processed image signal.

8. A control method of a display apparatus comprising:
    receiving a preset user's input from a user input device comprising a manipulation panel;
    displaying a user interface (UI) comprising a number keypad; and
    selecting a channel number from the displayed number keypad according to a user's input to the manipulation panel,
    wherein the manipulation panel is provided in the display apparatus and comprises a plurality of direction keys corresponding to four directions comprising a top direction, a bottom direction, a left direction and a right direction.

9. The control method according to claim 8, wherein the selecting the channel number comprises recognizing the user's input to the direction keys as a command to move in a direction of the number keypad corresponding to a direction key selected from the plurality of direction keys.

10. The control method according to claim 8, wherein the preset user's input comprises a combination of a plurality of keys located in the user input device.

11. The control method according to claim 8, further comprising:
    determining whether the display apparatus is in a television (TV) mode; and
    changing the display apparatus to a channel selection mode according to the preset user's input and displaying the number keypad if it is determined that the display apparatus is in the TV mode.

12. The control method according to claim 8, wherein the selecting the channel number comprises selecting at least one of numbers located in the number keypad.

13. The control method according to claim 8, further comprising displaying a result of the user's input in a display window.

14. The control method according to claim 8, further comprising:
    processing an image signal of a channel corresponding to the selected channel number; and
    displaying an image corresponding to the processed image signal.

15. An image display apparatus comprising:
    a display device which displays an image; and
    a manipulation panel which comprises a plurality of directional keys and a power key,
    wherein the display device displays a user interface (UI) comprising at least one of a number keypad and a display window on the basis of an input to the manipulation panel,
    wherein selected numbers on the number keypad are moved according to a manipulation of the directional keys.

16. The image display apparatus of claim 15, wherein the plurality of directional keys comprises channel-change keys and volume-change keys.

* * * * *